United States Patent
Yoon (12)

(10) Patent No.: US 11,155,183 B2
(45) Date of Patent: Oct. 26, 2021

(54) METHOD OF CONTROLLING BATTERY USING LATCHING RELAY AND BATTERY SYSTEM USING THE SAME

(71) Applicants: Hyundai Motor Company, Seoul (KR); Kia Motors Corporation, Seoul (KR)

(72) Inventor: Jong Hu Yoon, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 28 days.

(21) Appl. No.: 16/567,864

(22) Filed: Sep. 11, 2019

(65) Prior Publication Data

US 2020/0353842 A1    Nov. 12, 2020

(30) Foreign Application Priority Data

May 7, 2019  (KR) ........................ 10-2019-0052885

(51) Int. Cl.
*H02J 7/00*  (2006.01)
*B60L 58/20*  (2019.01)
*H02J 7/14*  (2006.01)

(52) U.S. Cl.
CPC ............ *B60L 58/20* (2019.02); *H02J 7/1446* (2013.01)

(58) Field of Classification Search
None
See application file for complete search history.

(56) References Cited

U.S. PATENT DOCUMENTS

2016/0089992 A1* 3/2016 Le ..................... H02J 7/00047
                                                    320/107
2018/0281615 A1* 10/2018 Kinoshita ............. H02J 7/0029
2019/0359078 A1* 11/2019 Yamada ................. B60L 53/60

* cited by examiner

*Primary Examiner* — Arun C Williams
(74) *Attorney, Agent, or Firm* — Mintz Levin Cohn Ferris Glovsky and Popeo, P.C.; Peter F. Corless

(57) ABSTRACT

A method of controlling a battery includes controlling a latching relay unit in response to vehicle state information, and converting a battery system of a vehicle into either a high-voltage battery system or a low-voltage battery system according to control of the latching relay unit.

19 Claims, 7 Drawing Sheets

FIG. 2

| SIGNAL | STATE |
|---|---|
| [IG OFF] | 48V |
| [IG ON] | 48V |
| LATCHING RELAY FORWARD CONTROL | 48V |
| LATCHING RELAY BACKWARD CONTROL | 12V |
| [IG OFF] | 12V |

| SIGNAL | STATE |
|---|---|
| [IG OFF] | 12V |
| [IG ON] | 12V |
| LATCHING RELAY BACKWARD CONTROL | 12V |
| LATCHING RELAY FORWARD CONTROL | 48V |
| [IG OFF] | 48V |

METHOD OF CONTROLLING BATTERY USING LATCHING RELAY AND BATTERY SYSTEM USING THE SAME

This application claims under 35 U.S.C. § 119(a) the benefit of Korean Patent Application No. 10-2019-0052885, filed on May 7, 2019, the entire contents of which are incorporated by reference herein.

BACKGROUND

(a) Technical Field

The present disclosure relates to a method of controlling a battery using a latching relay, and a battery system using the same.

(b) Description of the Related Art

In general, an electric vehicle is driven using a battery of a motor as a power source and consumes the battery due to heavy use of the motor. The most frequent issue among problems in terms of the quality of the battery is related to discharge of a 12 V battery, and current that is discharged in a situation in which a vehicle is left for a long time or the vehicle is turned off is larger than a predicted discharged current, and thus discharge of the 12 V battery occurs. That is, there is a need for a method of preventing discharge in a state in which a vehicle is turned off (IG OFF state).

To this end, there has been use of a method of applying a relay to a 12 V battery to prevent further current consumption via a load by measuring current or voltage to recognize a variation value in order to examine whether a controller is operated and discharge of the 12 V battery occurs when a vehicle is turned off, or a method of increasing a time period taken to discharge a battery by maximizing a battery capacitance in order to reduce discharge.

SUMMARY

An object of the present disclosure is to provide a method of controlling a battery using a latching relay, and a vehicle incorporating a battery system using the same.

In particular, the present disclosure provides a control method of structurally configuring a 48 V battery as if 12 V batteries are connected in parallel to each other to increase a maximum remaining time period during which a state in which a vehicle is turned off is maintained for a long time by only a 12 V battery.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of controlling a battery using a latching relay includes controlling a latching relay unit in response to vehicle state information, and converting a battery system of a vehicle into either a high-voltage battery system or a low-voltage battery system according to control of the latching relay unit.

In another aspect of the present disclosure, a battery system includes a low-voltage battery, a high-voltage battery, a latching relay unit including a plurality of latching relays for electrically connecting the low-voltage battery and the high-voltage battery to each other, and a controller configured to control the latching relay unit based on a vehicle state, wherein the controller converts a battery system of the vehicle to either a high-voltage battery system or a low-voltage battery system according to control of the latching relay unit.

In a further aspect of the present disclosure, a non-transitory computer readable medium contains program instructions executed by a processor, and the computer readable medium can include: program instructions that control a latching relay unit in response to vehicle state information; and program instructions that convert a battery system of a vehicle into either a high-voltage battery system or a low-voltage battery system according to control of the latching relay unit

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 2 is a diagram showing an example of battery control through a latching relay according to an embodiment of the present disclosure;

DETAILED DESCRIPTION OF THE DISCLOSURE

Figure 1:
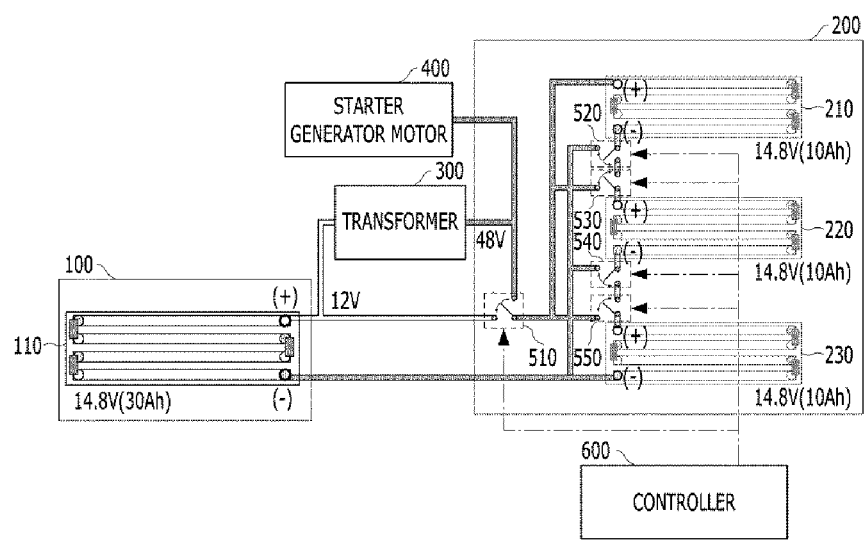
FIG. 1 is a diagram showing a battery system according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference will now be made in detail to the preferred embodiments of the present disclosure, examples of which are illustrated in the accompanying drawings. Wherever possible, the same reference numbers will be used throughout the drawings to refer to the same or like parts.

In description of exemplary embodiments, it will be understood that, when an element is referred to as being "on" or "under" another element, the element can be directly on another element or intervening elements may be present.

It will be understood that, although the terms first, second, A, B, (a), (b), etc. may be used herein to describe various elements of the present disclosure, these terms are only used to distinguish one element from another element and essential, order, or sequence of corresponding elements are not limited by these terms. It will be understood that when one element is referred to as being "connected to", "coupled to", or "access" another element, one element may be "connected to", "coupled to", or "access" another element via a further element although one element may be directly connected to or directly access another element.

All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings in the related art from the context. Unless differently defined in the present invention, such terms should not be interpreted in an ideal or excessively formal manner FIG. 1 is a diagram showing a battery system according to an embodiment of the present disclosure.

Referring to FIG. 1, the battery system may include a first battery 100, a second battery 200, a transformer 300, a starter generator motor 400, a latching relay unit 500, and a controller 600.

The first battery 100 may include at least one battery module. A battery module 110 of the first battery 100 may include a plurality of battery cells that are connected in series to each other.

For example, the battery module 110 of the first battery 100 may be configured in such a way that four battery cells with a voltage of about 3.7 V are connected in series to each other. The first battery 100 may have power of 14.8 V and may have a capacitance of 30 Ah.

Accordingly, the first battery 100 may be a 14.8 V power source in which the first battery 100 has a capacitance of 30 Ah. This may be referred to as a "12 V battery", and as necessary, may also be referred to as a "low-voltage battery".

The second battery 200 may include three battery modules 210, 220, and 230. The plurality of battery modules 210, 220, and 230 in the second battery 200 may be connected in series to each other. In this case, each of the plurality of battery modules 210, 220, and 230 may be configured in such a way that four battery cells with a voltage of about 3.7 V are connected in series to each other. That is, the battery modules 210, 220, and 230 of the second battery 200 may include eight battery cells with a capacitance of 10 Ah.

The plurality of battery modules 210, 220, and 230 may be connected in parallel to each other.

In some embodiments, when battery modules in the second battery 200 are connected in series to each other, the second battery 200 may be a power source of about 44.4 V, and when the battery modules are connected in parallel to each other, the second battery 200 may be a power source of about 14.8 V. This may be referred to as a "48 V battery", and as necessary, may also be referred to as a "high-voltage battery".

The transformer 300 may be connected to the first battery 100 and the second battery 200, may convert a voltage of the high-voltage battery into power of 12 V, and may supply the power to the low-voltage battery to charge the low-voltage battery.

The starter generator motor 400 may function as a starter motor when the vehicle is turned and may function as a generator for recovering energy after the vehicle is turned on or when the vehicle is turned off, and thus the starter generator motor 400 may be referred to as a "starter generator", and as necessary, may also be referred to as a "auxiliary motor".

The latching relay unit 500 may be disposed in a bus bar that electrically connects the first battery 100 and the second battery 200 to each other.

The latching relay unit 500 may include a plurality of latching relays. In this case, a component that is referred to as a latching relay may be a relay in which contacts are maintained in a connected state even if current is disconnected in a coil.

In some embodiments, the latching relay unit 500 according to the present disclosure may include first to fifth latching relays 510, 520, 530, 540, and 550. In this case, the plurality of latching relays may receive a control signal from the controller 600 and may perform an ON/OFF operation.

In some embodiments, when the latching relay unit 500 is controlled in an ON state, the first latching relay 510 may be turned on, the battery module of the second battery 200 may be connected to the starter generator motor 400 and the transformer 300, and the first battery 100 may be electrically connected to the second battery 200 through the transformer 300.

Therewith, the second to fifth latching relays 520, 530, 540, and 550 may be turned on, and the plurality of battery modules 210, 220, and 230 in the second battery 200 may be connected in series to each other.

In this case, the second battery 200 may be operated with 48 V, and thus such a battery state may be referred to as a "48 V system", and as necessary, may also be referred to as a "high-voltage battery system".

In some embodiments, when the latching relay unit 500 is controlled in an OFF state, the first latching relay 510 may be turned off, and the first battery 100 and the second battery 200 may be directly connected to each other.

Therewith, the second to fifth latching relays 520, 530, 540, and 550 may be turned off, and the battery modules in the second battery 200 may be connected in parallel to each other. That is, all of the battery module 110 of the first battery 100 and the battery modules 210, 220, and 230 of the second battery 200 may be connected in parallel to each other.

In this case, the second battery 200 may be operate with 12 V, and thus such a battery state may be referred to as a "12 V system", and as necessary, may also be referred to as a "low-voltage battery system".

The controller 600 may be referred to as an "electronic control unit (ECU)" that monitors a battery and controls a latching relay, and as necessary, may also be referred to as a "battery management system (BMS)".

The controller 600 may control the latching relay unit 500 in response to vehicle state information. In this case, the vehicle state information may include vehicle starting, underway driving, brake operating, neglected vehicle start off, or the like.

The controller 600 may determine a vehicle state to be one of IG ON/OFF states. In other words, the vehicle state can be either an ignition on (IG ON) or an ignition off (IG OFF) state.

In some embodiments, when the vehicle is in the IG ON state, the controller 600 may control the latching relay unit 500 in the ON state.

In some embodiments, when the vehicle is in the IG OFF state, the controller 600 may control the latching relay unit 500 in the OFF state.

The controller 600 may control the latching relay unit 500 via a pulse. The pulse control may include forward pulse control and backward pulse control.

In some embodiments, the controller 600 may perform forward pulse control on the latching relay. In this case, the latching relay unit 500 may be controlled in the ON state according to the forward pulse control.

In some embodiments, the controller 600 may perform backward pulse control on the latching relay. In this case, the latching relay unit 500 may be controlled in the OFF state according to the backward pulse control.

The controller 600 may convert the battery system of the vehicle in response to control of the latching relay unit 500. Such a relationship of a vehicle battery capacitance according to control of a latching relay is shown in FIG. 2.

FIG. 2 is a diagram showing an example of battery control through a latching relay according to an embodiment of the present disclosure.

Referring to FIG. 2A, the vehicle is in an IG OFF state, and the battery system is a 48 V system. In this case, when the vehicle is converted into an IG ON state, the battery system may be maintained as a 48 V system. Then, when the latching relay unit 500 performs forward pulse control, the latching relay unit 500 may be turned on and the battery system may be maintained as a 48 V system.

Then, when backward pulse control is performed on the latching relay unit 500, the latching relay unit 500 may be turned off and the battery system may be converted into a 12 V system. As such, in a state in which the battery system is a 12 V system, when the vehicle is in the IG OFF state, the battery system may be maintained in a 12 V system state.

That is, the battery system according to the present disclosure may pulse-control the latching relay unit 500 to convert the battery system from a 48 V system to a 12 V system before the vehicle is turned off. Accordingly, even if the controller 600 is powered off or there is no wake up signal, the battery system converted into a state of a 12 V battery system may be continuously maintained.

Referring to FIG. 2B, the vehicle is in an IG OFF and the battery system may be a 12 V system. In this case, when the vehicle is converted into an IG ON state, the battery may be maintained as a 12 V system. Then, when backward pulse control is performed on the latching relay unit 500 via backward pulse control, the latching relay unit 500 may be turned off, and the battery system may be maintained as a 12 V system.

Then, when forward pulse control is performed on the latching relay unit 500, the latching relay unit 500 may be turned on and the battery system may be converted into a 48 V system. As such, in a state in which the battery system is a 48 V system, when the vehicle is in the IG OFF state, the battery system may be maintained in a state of a 48 V system.

That is, the battery system according to the present disclosure may pulse-control the latching relay unit 500 to convert the battery system from a 12 V system to a 48 V system before the vehicle is turned off. Accordingly, even if the controller 600 is powered off or there is no wake up signal, the battery system converted into a state of a 48 V battery system may be continuously maintained.

Figure 3:
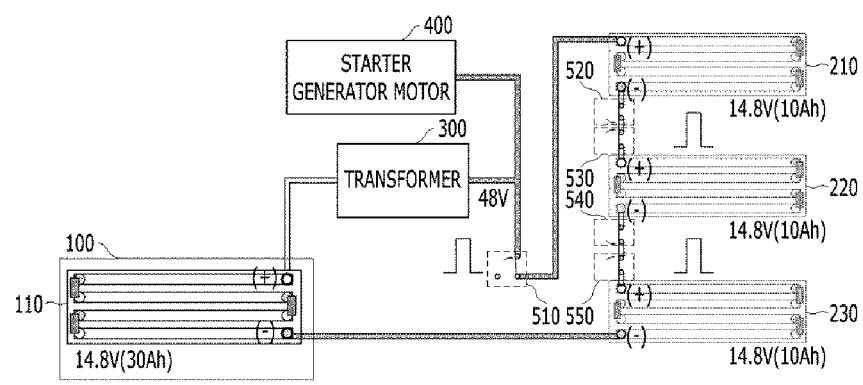
FIG. 3 is a diagram showing an operation of a latching relay based on forward pulse control according to an embodiment of the present disclosure.
Figure 4:
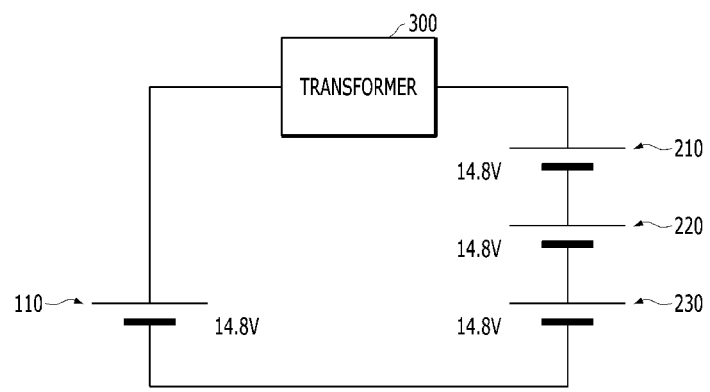
FIG. 4 is a diagram showing a high-voltage battery system according to the embodiment shown in FIG. 3.

FIG. 3 is a diagram showing an operation of a latching relay based on forward pulse control according to an embodiment of the present disclosure. FIG. 4 is a diagram showing a high-voltage battery system according to the embodiment shown in FIG. 3.

Referring to FIG. 3, when the controller 600 performs forward pulse control on the latching relay unit 500, the first latching relay 510 may be turned on, the second battery 200 may be connected to the transformer 300, the second to fifth latching relays 520, 530, 540, and 550 may be turned on, and the three battery modules 210, 220, and 230 in the second battery 200 may be connected in series to each other.

In some embodiments, when the vehicle is in the IG ON state and the battery system is converted into a 48 V system, if the vehicle is turned on, the battery system may supply power of 48 V to the starter generator motor 400 to turn on an engine.

In some embodiments, when a brake is operated while the vehicle is driven, energy may be recovered by the starter generator motor 400 and may be charged in a 48 V battery.

In some embodiments, when the vehicle is in the IG ON state and the vehicle is driven, a 12 V battery may be charged with power of a 48 V battery through the transformer 300 in order to prevent the 12 V battery from being discharged.

As shown in FIG. 4, the first battery 100 may be connected in series to the second battery 200 through the transformer 300. In this case, each of the battery modules 210, 220, and 230 of the second battery 200 has about 14.8 V, and thus the second battery 200 may have power of about 44.4 V. As such, the second battery 200 may charge the first battery 100 through the transformer 300.

Figure 5:
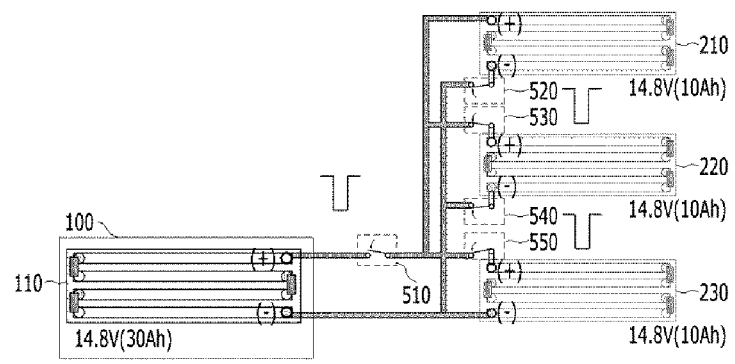
FIG. 5 is a diagram showing an operation of a latching relay based on backward pulse control according to an embodiment of the present disclosure.
Figure 6:
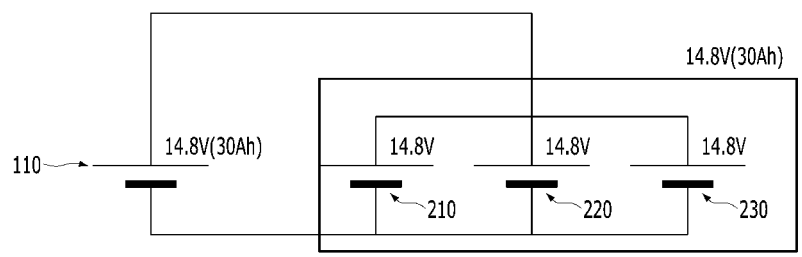
FIG. 6 is a diagram showing a low-voltage battery system according to the embodiment shown in FIG. 5.

FIG. 5 is a diagram showing an operation of a latching relay based on backward pulse control according to an embodiment of the present disclosure. FIG. 6 is a diagram showing a low-voltage battery system according to the embodiment shown in FIG. 5.

Referring to FIG. 5, when the controller 600 performs backward pulse control on the latching relay unit 500, the first latching relay 510 may be turned off, the second battery 200 may be connected in parallel to the first battery 100, the second to fifth latching relays 520, 530, 540, and 550 may be turned off, and the plurality of battery modules 210, 220, and 230 in the second battery 200 may be connected in parallel to each other.

As shown in FIG. 6, the second battery 200 may correspond to a power source of 14.8 V and 30 Ah by connecting three power sources of 14.8 V and 10 Ah in parallel to each other. Because the second battery 200 is connected to the first battery 100 in parallel to each other, the first battery 100 of 14.8 V and 30 Ah and the second battery 200 of 14.8 V and 30 Ah may be connected in parallel to each other, and thus a battery system may correspond to 14.8 V and 60 Ah. Accordingly, the battery system may have a voltage of 12 V and may have a battery capacitance that is increased to 60 Ah from an original capacitance of 30 Ah.

Figure 7:
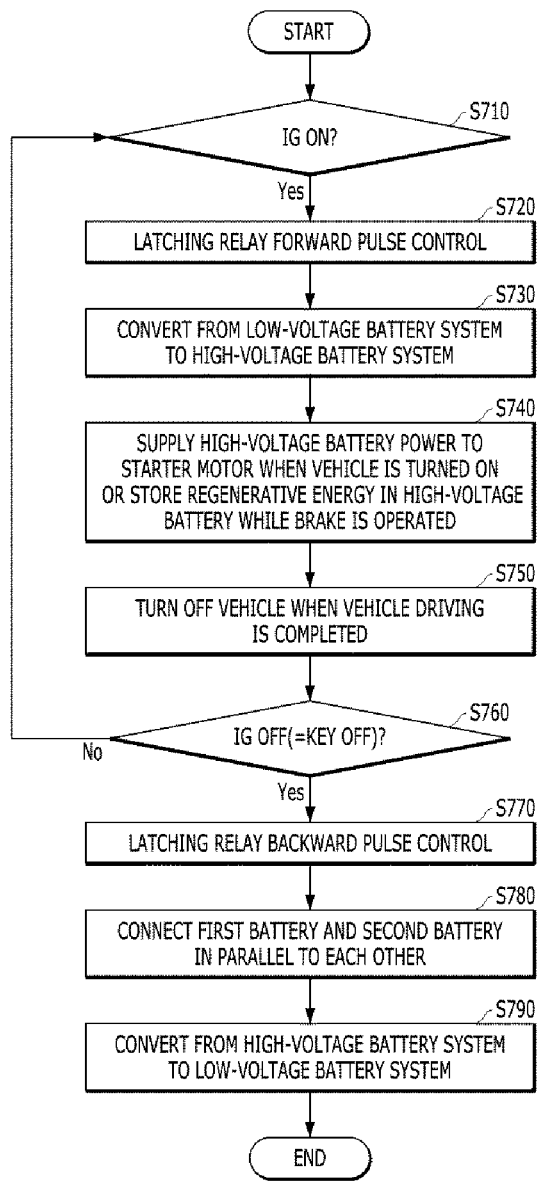
FIG. 7 is a flowchart showing a method of controlling a battery using a latching relay according to an embodiment of the present disclosure.

FIG. 7 is a flowchart showing a method of controlling a battery using a latching relay according to an embodiment of the present disclosure.

Referring to FIG. 7, a controller 500 may determine whether a vehicle is in an IG ON state based on vehicle state information (S710).

After operation 5710, when the vehicle is in the IG ON state, the controller 600 may control the latching relay unit 500 through a forward pulse (S720). Then, the latching relay unit 500 may become in an ON state according to the forward pulse control of the controller 500.

After operation S720, the battery system may be converted from a low-voltage battery system to a high-voltage battery system (S730). That is, the battery system may be configured as a 48 V battery system.

After operation S730, when the vehicle is in an IG ON state and the battery system is a high-voltage battery system, power may be supplied to the starter generator motor 400 when the vehicle is turned on, or regenerative energy based on a brake operation while the vehicle is driven may be stored in a second battery (S740).

After operation S740, vehicle driving may be completed and then the vehicle may be turned off.

After operation S750, when control for increasing a capacitance of a low-voltage battery of a vehicle is required, the controller 600 may determine whether the vehicle is in an IG OFF state (S760). In this case, the IG OFF state may be the same as a vehicle KEY OFF state.

After operation S760, when the vehicle in the IF OFF state, the controller 600 may control the latching relay unit 500 through a backward pulse (S770). Accordingly, the latching relay unit 500 may become in an OFF state according to backward pulse control of the controller 500.

After operation 5770, the second battery 200 may be converted into a configuration in which 12 V batteries are connected in parallel to each other (S780).

After operation S780, the first battery 100 and the second battery 200 of the battery system may be connected in parallel to each other (S790). As such, the battery system according to the present disclosure may be converted from a high-voltage battery system to a low-voltage battery system. That is, a 12 V battery system may be configured.

Through the aforementioned method, when the vehicle performs a function that requires a high-voltage battery system in an IG ON state and then the vehicle becomes an IG OFF state and is turned off, the battery system may be converted from a high-voltage battery system to a low-voltage battery to increase a capacitance of the low-voltage battery system and to prevent a vehicle battery from being discharged, thereby ensuring the safety of the vehicle.

A method of controlling a battery using a latching relay and a vehicle using the same according to the present disclosure may have the following effects.

First, an electrical connection configuration of a battery using a latching relay may be converted in a vehicle to which a 12 V battery and a 48 V battery are applied, and thus a function that is required in the 48 V battery may be originally used and then a capacitance of a 12 V battery may be increased when the vehicle is in an IG OFF state to maximize a left time, and thus a user may minimize vehicle battery discharging.

Second, the cost for replacement of a 12 V battery due to an issue in terms of battery discharging may be reduced.

Third, the number of defective 12 V batteries due to battery discharging quality may be reduced to be advantageously involved in customer trust with respect to the quality of a vehicle.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc. The computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

What is claimed is:

1. A method of controlling a low-voltage battery and a high-voltage battery using a latching relay, the method comprising:
    controlling, by a controller, a latching relay unit in response to vehicle state information; and
    converting, by the controller, a battery system of a vehicle into either a high-voltage battery system or a low-voltage battery system according to control of the latching relay unit,
    wherein the low-voltage battery includes a first battery module corresponding to a specific voltage,
    wherein the high-voltage battery includes a plurality of second battery modules, each of the plurality of second battery modules corresponding to the specific voltage, and
    wherein the plurality of second battery modules are connected in series in the high-voltage battery system by the control of the latching relay unit, and all of the plurality of second battery modules are connected in parallel to each other in the low-voltage battery system by the control of the latching relay unit.

2. The method of claim 1, wherein controlling the latching relay unit includes determining a state of the vehicle to be an ignition on or an ignition off state.

3. The method of claim 2, further comprising, when the vehicle is in the ignition on state, controlling the latching relay unit in an on state.

4. The method of claim 3, further comprising, when the battery system operates using the low-voltage battery and the latching relay unit is controlled in the on state, converting the battery system from the low-voltage battery system to the high-voltage battery system.

5. The method of claim 4, wherein the high-voltage battery system supplies power by connecting a starter generator motor and the high-voltage battery to each other when the vehicle is turned on.

6. The method of claim 4, wherein the high-voltage battery system recovers energy through a starter generator motor and charges the high-voltage battery when a brake is operated while the vehicle is driven.

7. The method of claim 2, further comprising, when the vehicle is in the ignition off state, controlling the latching relay unit in an off state.

8. The method of claim 7, further comprising, when the latching relay unit is controlled in the off state, converting the battery system from the high-voltage battery system to the low-voltage battery system.

9. The method of claim 8, wherein the low-voltage battery system is configured such that all battery modules included in the low-voltage battery and the high-voltage battery are connected in parallel to each other.

10. A non-transitory computer readable medium containing program instructions executed by a processor, the computer readable medium comprising:
   program instructions that control a latching relay unit in response to vehicle state information; and
   program instructions that convert a battery system of a vehicle into either a high-voltage battery system or a low-voltage battery system according to control of the latching relay unit,
   wherein the battery system includes a low-voltage battery and a high-voltage battery,
   wherein the low-voltage battery includes a first battery module corresponding to a specific voltage,
   wherein the high-voltage battery includes a plurality of second battery modules, each of the plurality of second battery modules corresponding to the specific voltage, and
   wherein the plurality of second battery modules are connected in series in the high-voltage battery system by the control of the latching relay unit, and all of the plurality of second battery modules are connected in parallel to each other in the low-voltage battery system by the control of the latching relay unit.

11. A battery system of a vehicle, comprising:
   a low-voltage battery;
   a high-voltage battery;
   a latching relay unit including a plurality of latching relays for electrically connecting the low-voltage battery and the high-voltage battery to each other; and
   a controller configured to control the latching relay unit based on a vehicle state,
   wherein the controller converts the battery system of the vehicle to either a high-voltage battery system or a low-voltage battery system according to control of the latching relay unit,
   wherein the low-voltage battery includes a first battery module corresponding to a specific voltage,
   wherein the high-voltage battery includes a plurality of second battery modules, each of the plurality of second battery modules corresponding to the specific voltage, and
   wherein the plurality of second battery modules are connected in series in the high-voltage battery system by the control of the latching relay unit, and all of the plurality of second battery modules are connected in parallel to each other in the low-voltage battery system by the control of the latching relay unit.

12. The battery system of claim 11, wherein the controller determines a state of the vehicle to be an ignition on or an ignition off state.

13. The battery system of claim 12, wherein the controller controls the latching relay unit in an on state when the vehicle is in the ignition on state.

14. The battery system of claim 13, wherein the controller converts the battery system from the low-voltage battery system to the high-voltage battery system when the battery system operates using the low-voltage battery and the latching relay unit is controlled in the on state.

15. The battery system of claim 14, wherein the high-voltage battery system supplies power by connecting a starter generator motor and the high-voltage battery to each other when the vehicle is turned on.

16. The battery system of claim 14, wherein the high-voltage battery system recovers energy through a starter generator motor and charges the high-voltage battery when a brake is operated while the vehicle is driven.

17. The battery system of claim 12, wherein, when the vehicle is in the ignition off state, the controller controls the latching relay unit in an off state.

18. The battery system of claim 17, wherein, when the latching relay unit is controlled in the off state, the controller converts the battery system from the high-voltage battery system to the low-voltage battery system.

19. The battery system of claim 18, wherein the low-voltage battery system is configured such that all battery modules included in the low-voltage battery and the high-voltage battery are connected in parallel to each other.

* * * * *